Patented Mar. 6, 1923.

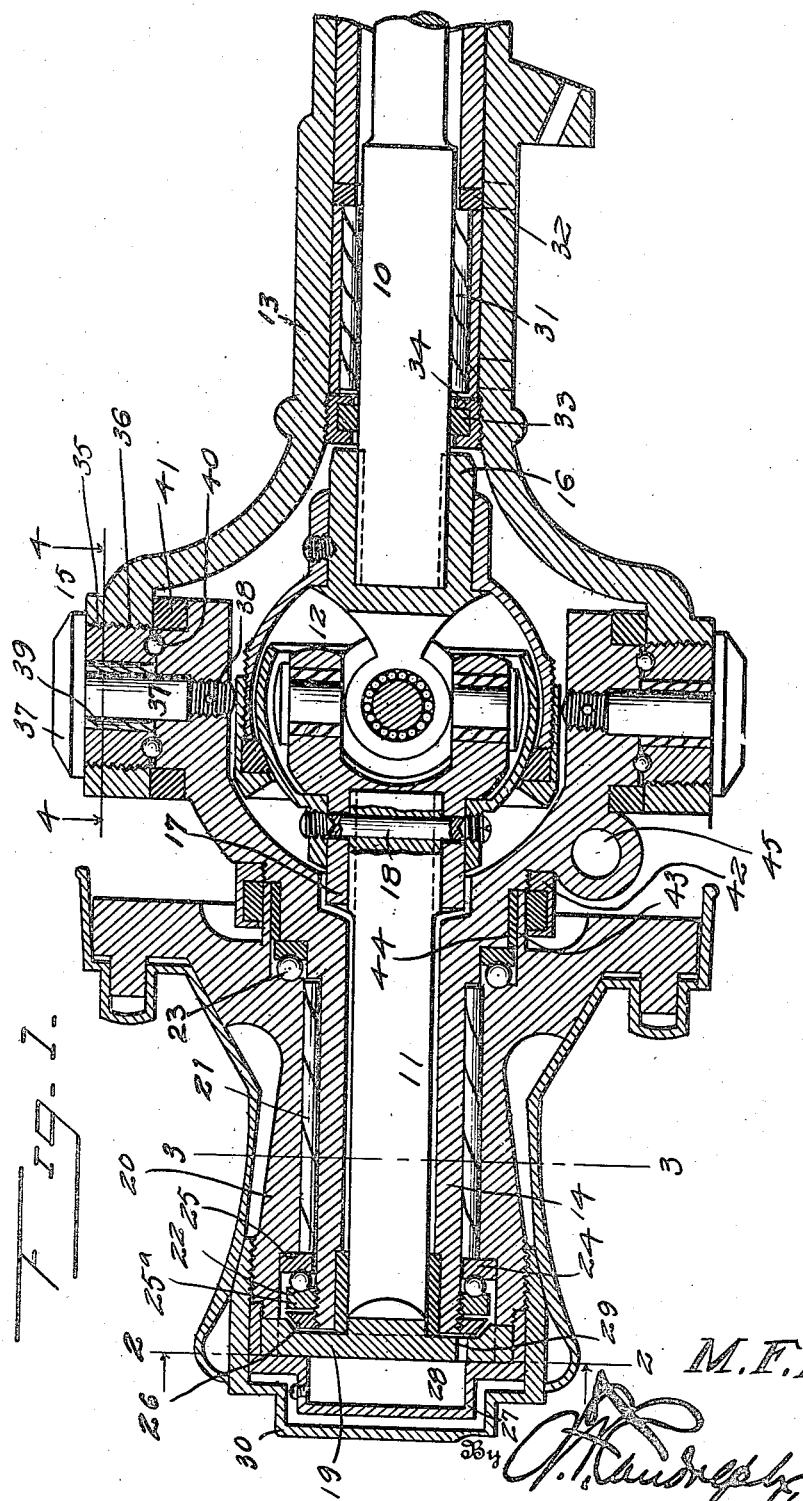

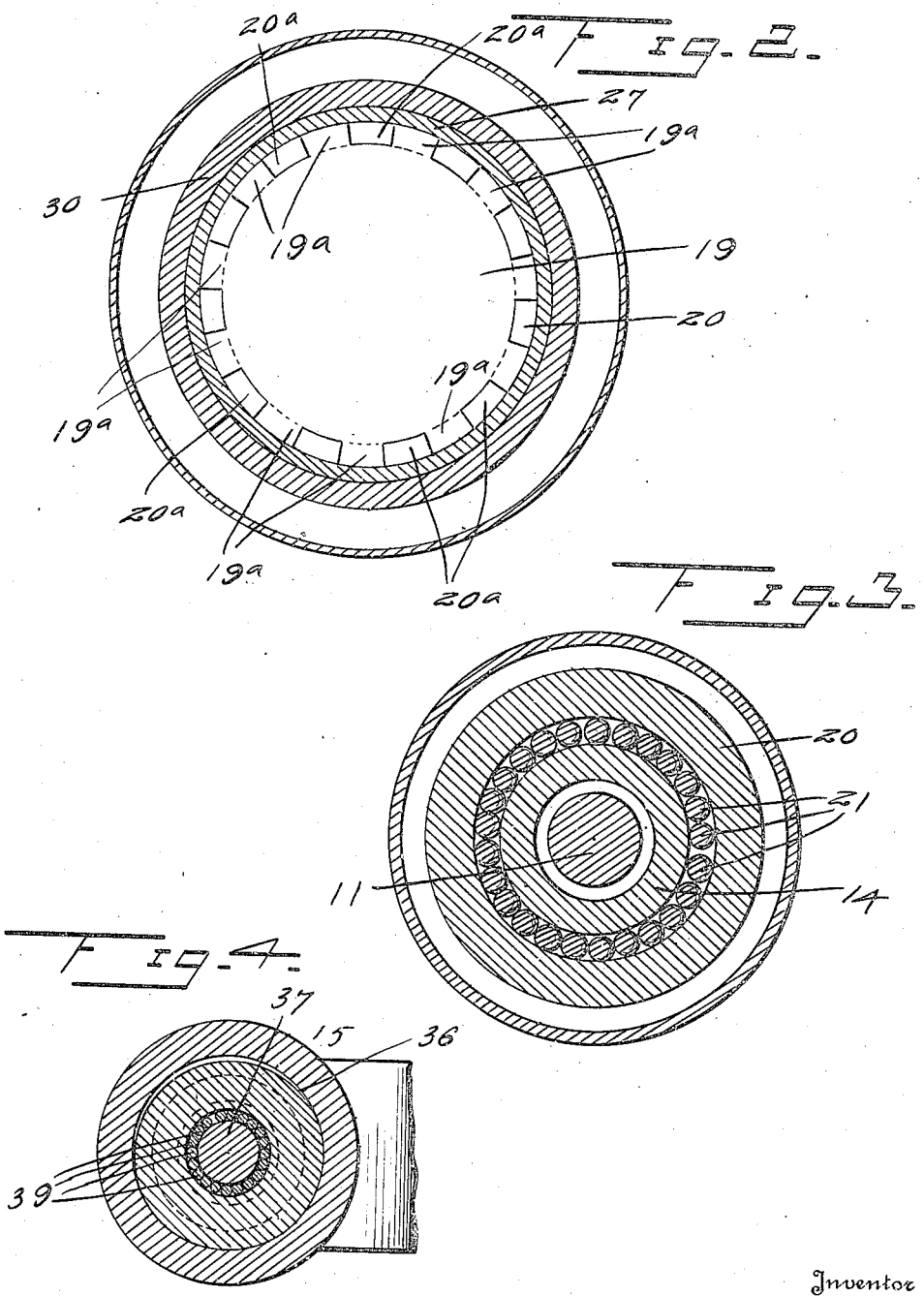

1,447,572

UNITED STATES PATENT OFFICE.

MATT F. ROSS, OF WINDFALL, INDIANA.

FRONT-WHEEL DRIVE FOR MOTOR VEHICLES.

Application filed June 6, 1921. Serial No. 475,373.

*To all whom it may concern:*

Be it known that I, MATT F. Ross, a citizen of the United States, residing at Windfall, in the county of Tipton and State of Indiana, have invented certain new and useful Improvements in a Front-Wheel Drive for Motor Vehicles; and I do hereby declare the following to be a full, clear, and exact description of the invention, such as will enable others skilled in the art to which it appertains to make and use the same.

The object of the invention is to provide a relatively simple and at the same time strong, durable and efficient front wheel drive construction adapted for use in connection with motor vehicles, and more particularly to provide a steering knuckle or joint construction in connection with the drive mechanism whereby the maximum of strength with facility of operation may be attained under conditions insuring proper lubrication and the exclusion of dust and foreign materials; and moreover to provide specific and reliable means for minimizing the risk of a wreck or other damage or injury to the vehicle in the event of breakage of the axle spindle while providing improved means for minimizing the tendency of the spindle to breakage; and with these and related objects in view as will appear in the course of the following description, the invention consists in a construction, combination and relation of parts of which a preferred embodiment is shown in the accompanying drawings, wherein:

Figure 1 is a longitudinal sectional view of a front wheel drive axle and steering knuckle embodying the invention.

Figure 2 is a transverse sectional view on the line 2—2 of Figure 1.

Figure 3 is a transverse section on the plane indicated by the line 3—3 of Figure 1.

Figure 4 is a section on the plane indicated by the line 4—4 of Figure 1.

The drive axle shaft consists of the main drive shaft 10, and the stub shaft 11 connected by a universal joint 12, the former being mounted in the axle casing 13 with which is connected the bearing spindle 14 through the knuckle joint or hinge 15.

The particular construction of the universal joint 12 is not pertinent to the present invention other than that the members thereof are provided with hubs 16 and 17 in which are splined the extremities respectively of the main and stub shaft members 10 and 11, the fastening of the latter being supplemented by a safety pin 18 which provides against the dismounting of the wheel hub even in the event of the breakage of the bearing spindle.

At its outer end the stub shaft carries a fixed, preferably integral disk 19 which has a peripheral interlocking engagement with the outer end of the hub 20, said disk and hub being provided with interlocking teeth or tongues 19$^a$ and 20$^a$, said hub being mounted upon the spindle 14 by means of rollers 21 and terminal thrust bearings 22 and 23 of the ball type, and the inner ball ring 24 of the outer thrust ball bearing 22 is engaged with a shoulder 25 in the interior of the hub. The outer ball race ring 25$^a$ is secured in place by a ring nut 26, and threaded upon the outer end of the hub is a hub cap 27 serving to insure the interlocking relation of the stub shaft member 11 with the hub, said hub cap being hollow to provide an oil cup or space 28 in communication by means of a port 29 with the thrust bearing at the outer end of the spindle and through said bearings with the roller bearings for the hub. Also a wheel cap 30 is fitted over the hub cap, and is threaded upon the exterior surface of the hub.

The main drive shaft member 10 is mounted in the casing 13 by means of the bearing rollers 31 at one end of which is arranged the roller race collar 32 while at the other end is arranged the felt oil retainer or packing ring 33 fitted in a gland 34.

In order that the steering of the car may be facilitated and may be accomplished with the least possible resistance due to friction, it is preferred to employ a ball and roller bearing ring 35 threaded in one member of the hinge or knuckle as shown at 36 and a hinge pin 37 extending through the said ring and threaded as at 38 in the other hinge or knuckle member, anti-friction bearing rollers 39 being interposed between the pin and inner surface of the ring and anti-friction bearing balls 40 being arranged at the inner end of the ring with suitable felt oil retainers or packing elements 41 interposed between the hinge or knuckle members and with the head of the hinge pin overlapping the bearing ring. It will be obvious that adjustment of the bearing ring may be effected to take up lost motion and prevent looseness while insuring freedom of relative movement of the hinge or knuckle members.

Also a felt gland 42 is arranged at the inner end of the hub overlapping the flange 43 thereof and a felt oil retaining ring 44 is fitted inside of said flange to prevent the escape of oil from the inner ball bearing 23 of the hub. The eye 45 is provided for the steering cross arm.

From the foregoing description note that without interfering in any way with the steering facilities of the front axle or the means whereby the steering wheels are mounted thereon, and without substantially modifying the general appearance of the steering knuckle or the dimensions thereof, it is possible by the arrangement indicated to effect a direct drive of the front wheels under conditions insuring the proper mounting and lubrication thereof and with the minimum of risk incident to breakage or otherwise.

Having thus described the invention, what I claim is:—

1. A front wheel drive for motor driven vehicles having main and stub axle shaft members connected by a universal joint in alignment with the axle hinge or knuckle, the stub shaft extending axially through the wheel spindle and having a terminal disk interlocked with the outer end of the wheel hub, terminal anti-friction thrust bearings and an intermediate roller bearing being provided for the hub, a chambered hub cap being threaded upon the outer end of the hub in spanning relation with the stub shaft disk and in ported communication with the spindle bearing.

2. A front wheel drive for motor driven vehicles having main and stub axle shaft members connected by a universal joint in alignment with the axle hinge or knuckle, the stub shaft extending axially through the wheel spindle and having a terminal disk interlocked with the outer end of the wheel hub, the hinge or knuckle joint having a bearing ring threaded in one member of the knuckle with an anti-friction thrust bearing at the inner end thereof, and a hinge pin extending through said bearing ring and engaged with the other member of the knuckle, bearing rollers being interposed between the bearing ring and the bearing pin.

3. A front wheel drive for motor driven vehicles having main and stub axle shaft members connected by a universal joint in alignment with the axle hinge or knuckle, the stub shaft extending axially through the wheel spindle and having a terminal disk interlocked with the outer end of the wheel hub, a hub cap threaded upon the outer end of the hub in spanning relation therewith, and said hub cap engaging said disk and holding the same in interlocking engagement with the hub.

4. A front wheel drive for motor driven vehicles having main and stub axle shaft members connected by a universal joint in alignment with the axle hinge or knuckle, the stub shaft extending axially through the wheel spindle and having a terminal disk interlocked with the outer end of the wheel hub, said wheel hub having an annular shoulder formed adjacent its outer end, a hub cap threaded on said shoulder and having portions engaging said disk, whereby to hold said disk in interlocking engagement with said hub.

5. A front wheel drive for motor driven vehicles having main and stub axle shaft members connected by a universal joint in alignment with the axle hinge or knuckle, the stub shaft extending axially through the wheel spindle and having a terminal disk interlocked with the outer end of the wheel hub, said wheel hub having an annular shoulder formed adjacent its outer end, a hub cap threaded on said shoulder and having portions engaging said disk, whereby to hold said disk in interlocking engagement with said hub, and said cap being hollow to provide an oil cup or chamber in ported communication with the hub spindle bearing.

In testimony whereof I affix my signature in presence of two witnesses.

MATT F. ROSS.

Witnesses:
J. F. PYKE,
JAMES HAMMELL.